US012631769B2

(12) United States Patent
Mohammed et al.

(10) Patent No.: US 12,631,769 B2
(45) Date of Patent: May 19, 2026

(54) ENHANCED POSITION ACCURACY FOR POSITIONING PERFORMANCE IMPROVEMENT

(71) Applicant: QUALCOMM Incorporated, San Diego, CA (US)

(72) Inventors: Qutubuddin Mohammed, Santa Clara, CA (US); Lohitha Ratnaraj, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 18/469,600

(22) Filed: Sep. 19, 2023

(65) Prior Publication Data

US 2025/0093527 A1 Mar. 20, 2025

(51) Int. Cl.
G01S 19/42 (2010.01)
G01S 19/23 (2010.01)

(52) U.S. Cl.
CPC ............ G01S 19/421 (2013.01); G01S 19/23 (2013.01)

(58) Field of Classification Search
CPC .......... G01S 19/22; G01S 19/23; G01S 19/28; G01S 19/396; G01S 19/421
See application file for complete search history.

(56) References Cited

U.S. PATENT DOCUMENTS

| | | | | |
|---|---|---|---|---|
| 11,876,941 B1 * | 1/2024 | Suiter | .................. | G06F 40/169 |
| 2014/0057649 A1 * | 2/2014 | Han | ..................... | H04W 4/025 455/456.1 |

* cited by examiner

*Primary Examiner* — Timothy A Brainard
(74) *Attorney, Agent, or Firm* — Holland & Hart LLP

(57) ABSTRACT

A user equipment includes processor(s) configured to: determine a first acquired satellite vehicle (SV) list including first SV(s) from which a user equipment (UE) is receiving signals within a current epoch; for each first SV in the first acquired SV list, determine whether a first measurement error associated with the first SV indicates a line of sight (LOS) between the UE and the first SV; for each first SV in the first acquired SV list, in response to the first measurement error indicating the LOS between the UE and the first SV, add the first SV to an active SV list; determine whether a number of SVs in the active SV list meets a threshold; and in response to the number of SVs in the active SV list meeting the threshold, determine a position of the UE based on the signals received from the SVs in the active SV list.

24 Claims, 7 Drawing Sheets

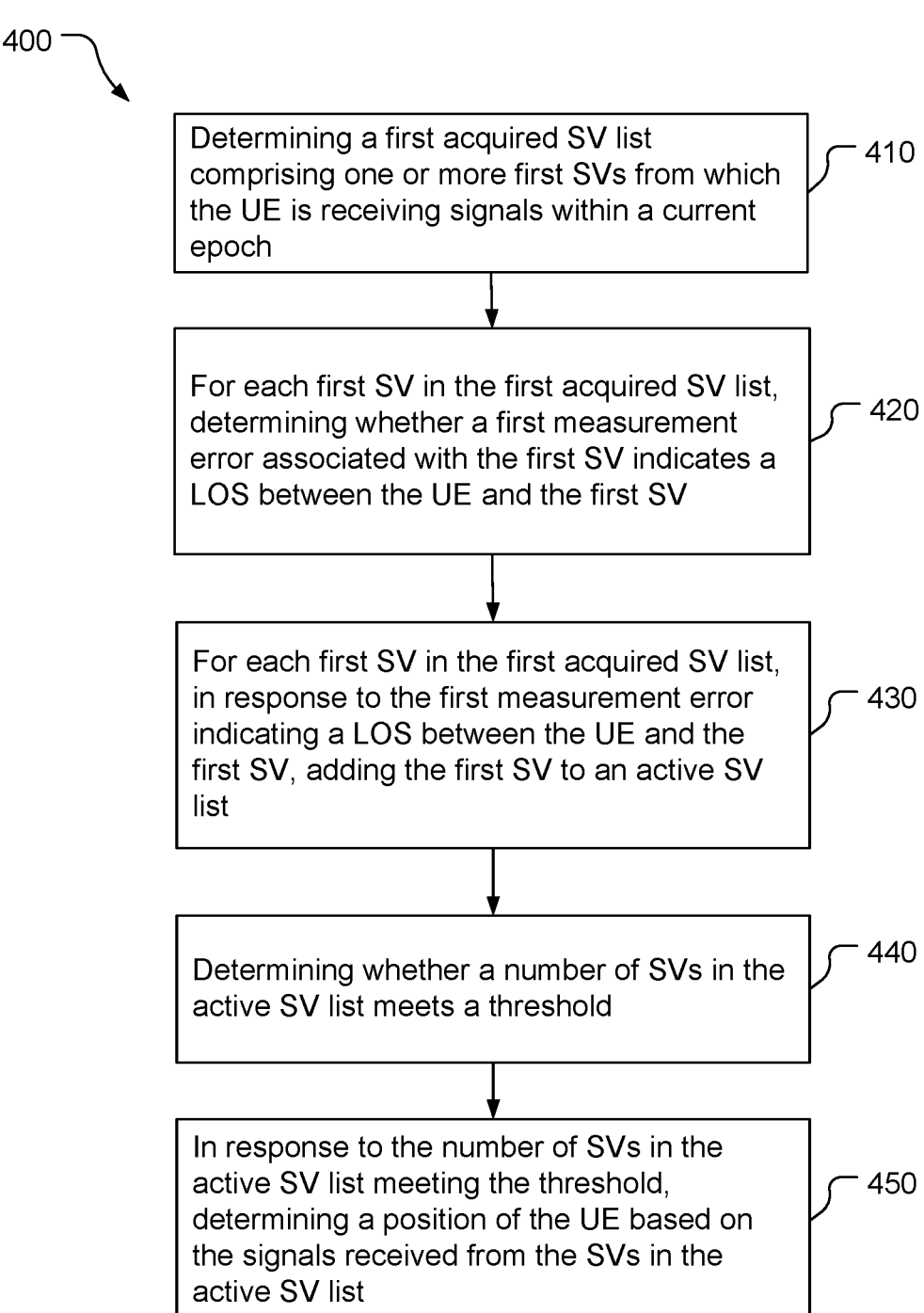

400

Determining a first acquired SV list comprising one or more first SVs from which the UE is receiving signals within a current epoch — 410

For each first SV in the first acquired SV list, determining whether a first measurement error associated with the first SV indicates a LOS between the UE and the first SV — 420

For each first SV in the first acquired SV list, in response to the first measurement error indicating a LOS between the UE and the first SV, adding the first SV to an active SV list — 430

Determining whether a number of SVs in the active SV list meets a threshold — 440

In response to the number of SVs in the active SV list meeting the threshold, determining a position of the UE based on the signals received from the SVs in the active SV list — 450

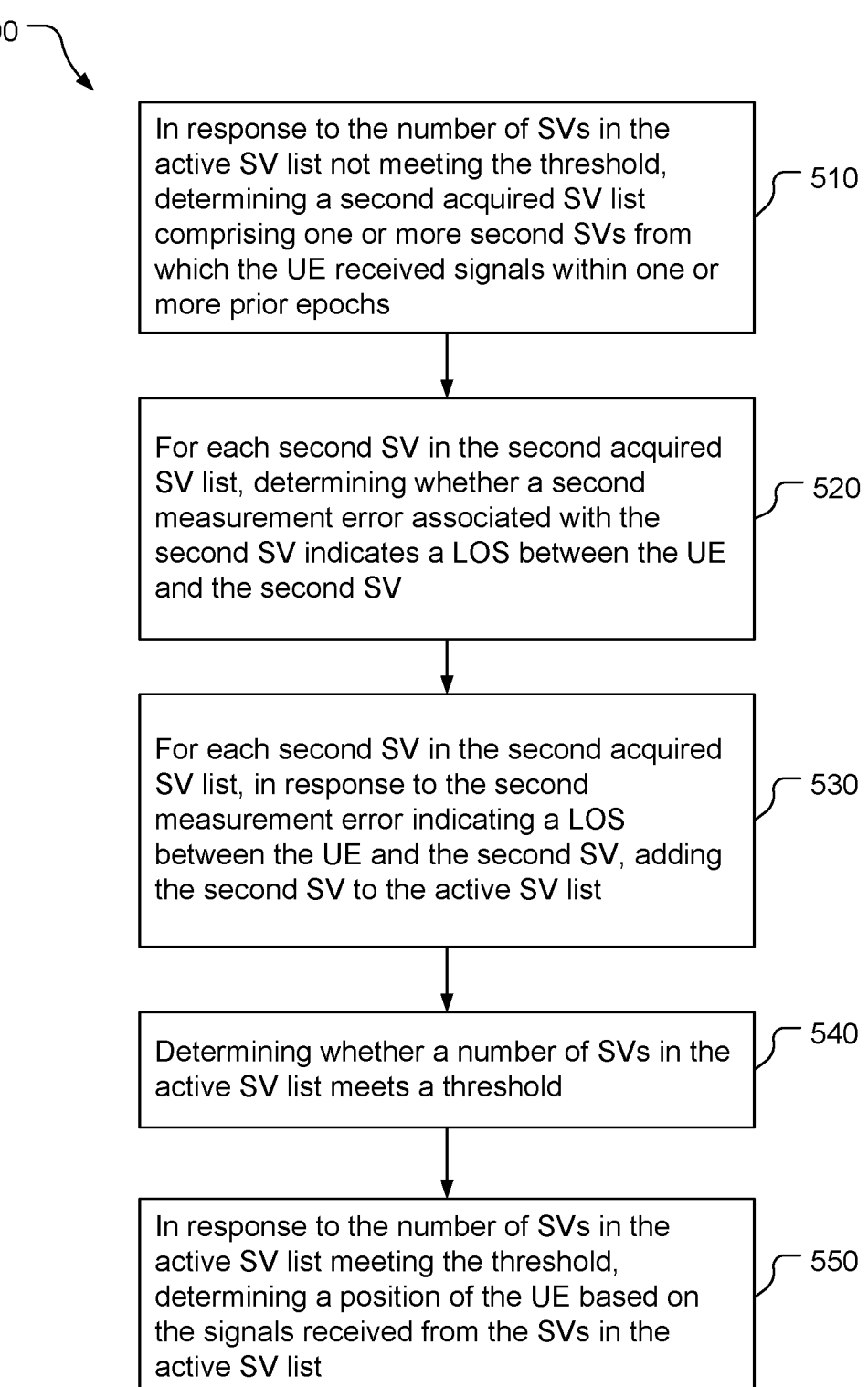

In response to the number of SVs in the active SV list not meeting the threshold, determining a second acquired SV list comprising one or more second SVs from which the UE received signals within one or more prior epochs  — 510

For each second SV in the second acquired SV list, determining whether a second measurement error associated with the second SV indicates a LOS between the UE and the second SV  — 520

For each second SV in the second acquired SV list, in response to the second measurement error indicating a LOS between the UE and the second SV, adding the second SV to the active SV list  — 530

Determining whether a number of SVs in the active SV list meets a threshold  — 540

In response to the number of SVs in the active SV list meeting the threshold, determining a position of the UE based on the signals received from the SVs in the active SV list  — 550

FIG. 5

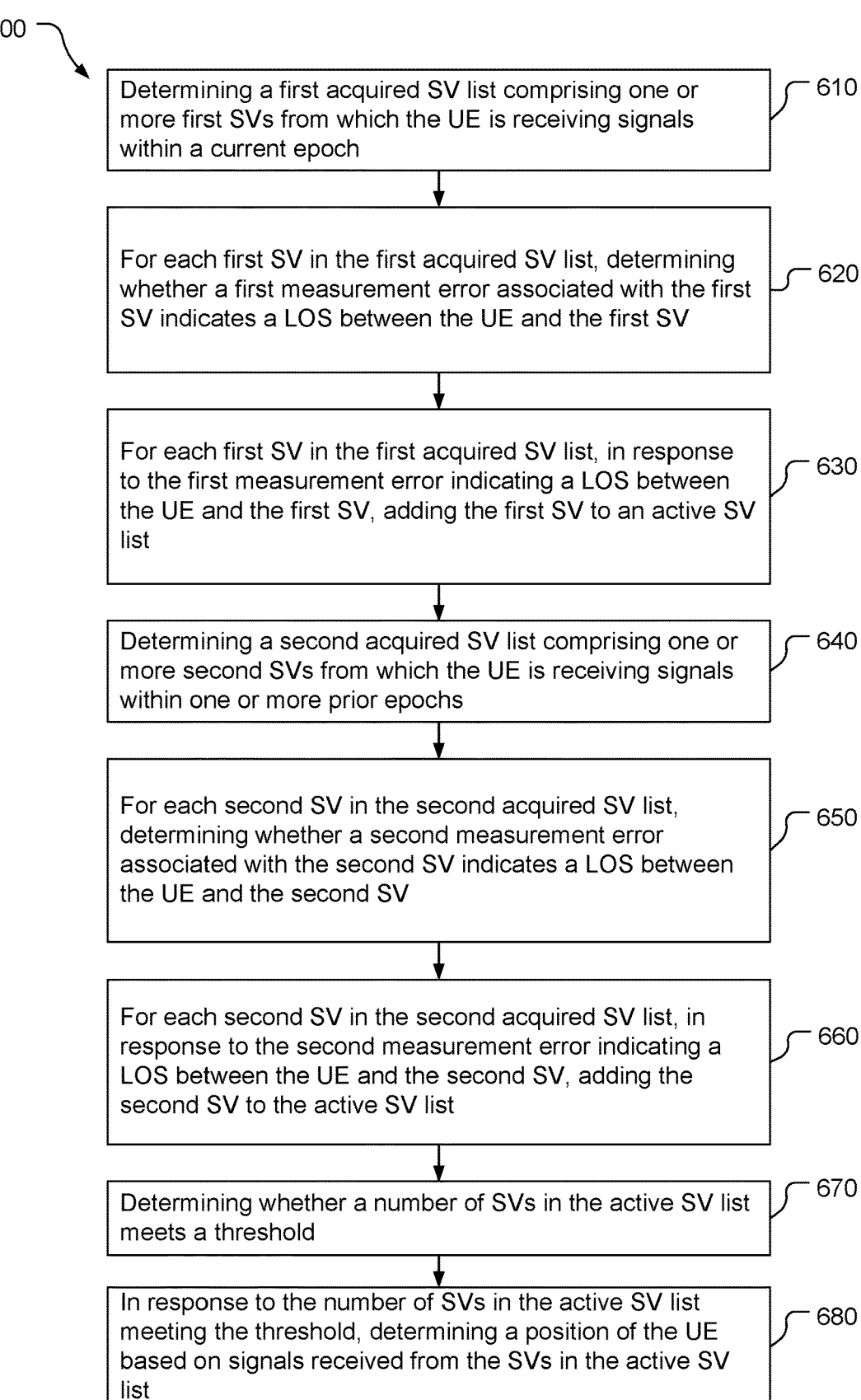

600

610 — Determining a first acquired SV list comprising one or more first SVs from which the UE is receiving signals within a current epoch 620 — For each first SV in the first acquired SV list, determining whether a first measurement error associated with the first SV indicates a LOS between the UE and the first SV 630 — For each first SV in the first acquired SV list, in response to the first measurement error indicating a LOS between the UE and the first SV, adding the first SV to an active SV list 640 — Determining a second acquired SV list comprising one or more second SVs from which the UE is receiving signals within one or more prior epochs 650 — For each second SV in the second acquired SV list, determining whether a second measurement error associated with the second SV indicates a LOS between the UE and the second SV 660 — For each second SV in the second acquired SV list, in response to the second measurement error indicating a LOS between the UE and the second SV, adding the second SV to the active SV list 670 — Determining whether a number of SVs in the active SV list meets a threshold 680 — In response to the number of SVs in the active SV list meeting the threshold, determining a position of the UE based on signals received from the SVs in the active SV list

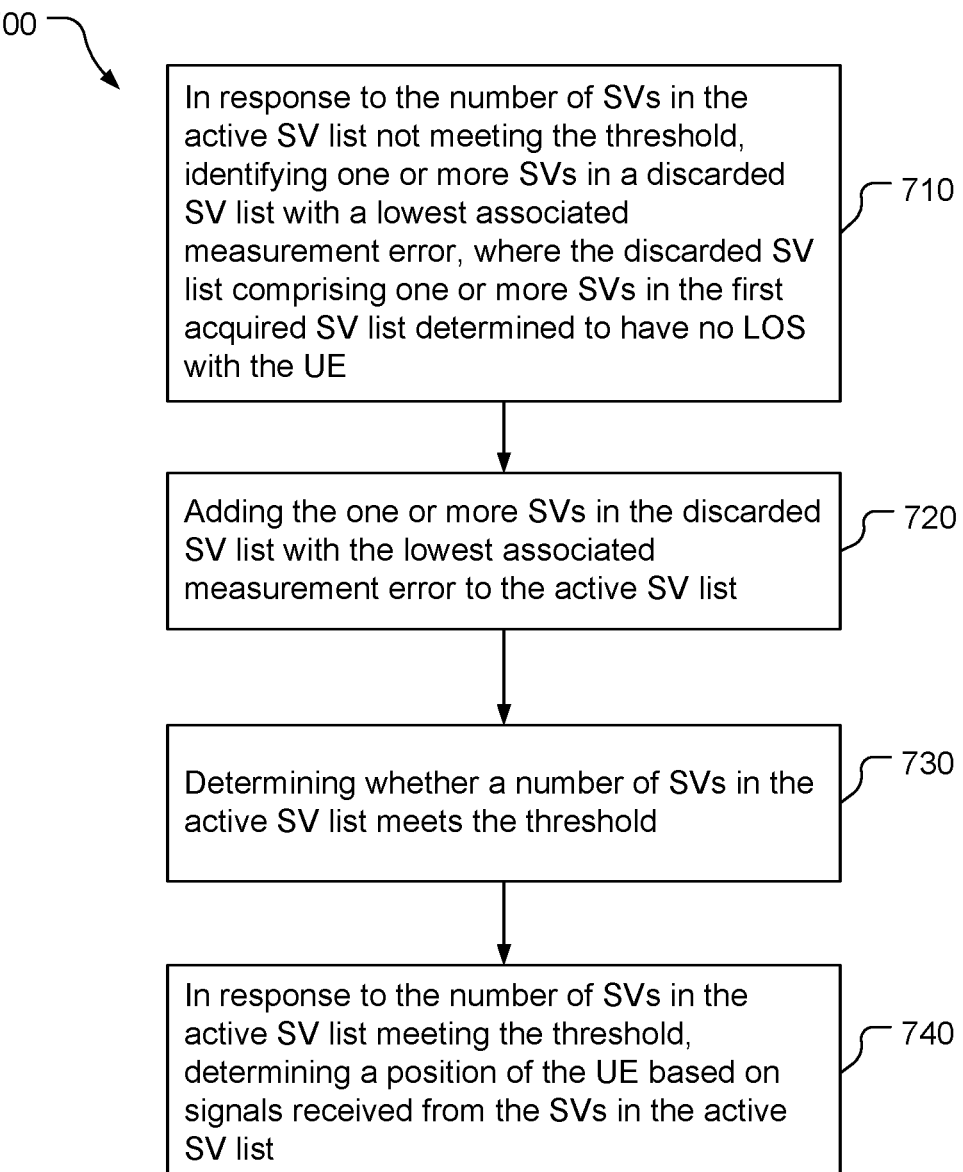

In response to the number of SVs in the active SV list not meeting the threshold, identifying one or more SVs in a discarded SV list with a lowest associated measurement error, where the discarded SV list comprising one or more SVs in the first acquired SV list determined to have no LOS with the UE
— 710

Adding the one or more SVs in the discarded SV list with the lowest associated measurement error to the active SV list
— 720

Determining whether a number of SVs in the active SV list meets the threshold
— 730

In response to the number of SVs in the active SV list meeting the threshold, determining a position of the UE based on signals received from the SVs in the active SV list
— 740

FIG. 7

ENHANCED POSITION ACCURACY FOR POSITIONING PERFORMANCE IMPROVEMENT

BACKGROUND

Global navigation satellite systems (GNSS) are used to determine a global position and/or location of any number of mobile stations. A GNSS may include a constellation of orbiting satellites that each transmit a time-synchronized signal. A mobile station may receive the time-synchronized signal from a number of GNSS satellites. By determining a time of transmission associated with each received time-synchronized signal and having knowledge of the location of each of the satellites that transmitted each received time-synchronized signal, the mobile station may determine its global location. The typical resolution of GNSS systems is typically in the range of two to three meters, however, this resolution may be reduced when the time-synchronized signals are obstructed by natural and man-made barriers, such as mountains, canyons, urban canyons, and tunnels.

SUMMARY

In an example, a user equipment includes: one or more memories; and one or more processors communicatively coupled to the one or more memories, the one or more processors being configured to: determine a first acquired satellite vehicle list including one or more first satellite vehicles from which the user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine whether a number of satellite vehicles in the active satellite vehicle list meets a threshold; and in response to the number of satellite vehicles in the active satellite vehicle list meeting the threshold, determine a position of the user equipment based on the signals received from the satellite vehicles in the active satellite vehicle list.

In another example, a method for determining a position of a user equipment, includes: determining a first acquired satellite vehicle list including one or more first satellite vehicles from which the user equipment is receiving signals within a current epoch; for each first satellite vehicle in the first acquired satellite vehicle list, determining whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, adding the first satellite vehicle to an active satellite vehicle list; determining whether a number of satellite vehicles in the active satellite vehicle list meets a threshold; and in response to the number of satellite vehicles in the active satellite vehicle list meeting the threshold, determining a position of the user equipment based on the signals received from the satellite vehicles in the active satellite vehicle list.

In another example, a computing device, includes: means for determining a first acquired satellite vehicle list including one or more first satellite vehicles from which a user equipment is receiving signals within a current epoch; means for, for each first satellite vehicle in the first acquired satellite vehicle list, determining whether a first measurement error associated with the first satellite vehicle indicates a line of sight between the user equipment and the first satellite vehicle; means for, for each first satellite vehicle in the first acquired satellite vehicle list, in response to the first measurement error indicating the line of sight between the user equipment and the first satellite vehicle, adding the first satellite vehicle to an active satellite vehicle list; means for determining whether a number of satellite vehicles in the active satellite vehicle list meets a threshold; and means for, in response to the number of satellite vehicles in the active satellite vehicle list meeting the threshold, determining a position of the user equipment based on the signals received from the satellite vehicles in the active satellite vehicle list.

In another example, a non-transitory, processor-readable storage medium including processor-readable instructions to cause one or more processors to: determine a first acquired satellite vehicle list including one or more first satellite vehicles from which a user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine whether a number of satellite vehicles in the active satellite vehicle list meets a threshold; and in response to the number of satellite vehicles in the active satellite vehicle list meeting the threshold, determine a position of the user equipment based on the signals received from the satellite vehicles in the active satellite vehicle list.

BRIEF DESCRIPTION OF THE DRAWINGS

FIG. 4 illustrates a flow diagram of a method for determining a position of a user equipment with consideration of measurement errors for SV signals received within a current epoch.

FIG. 5 illustrates a flow diagram of a method for determining a position of a user equipment with consideration of measurement errors for SV signals received within one or more prior epochs.

FIG. 6 illustrates a flow diagram of a method for determining a position of the user equipment with consideration of measurement errors for SV signals received within a current epoch and one or more prior epochs.

FIG. 7 illustrates a flow diagram of a method for determining a position of the user equipment using satellite vehicles discarded in the method of FIG. 4.

DETAILED DESCRIPTION

Figure 1:
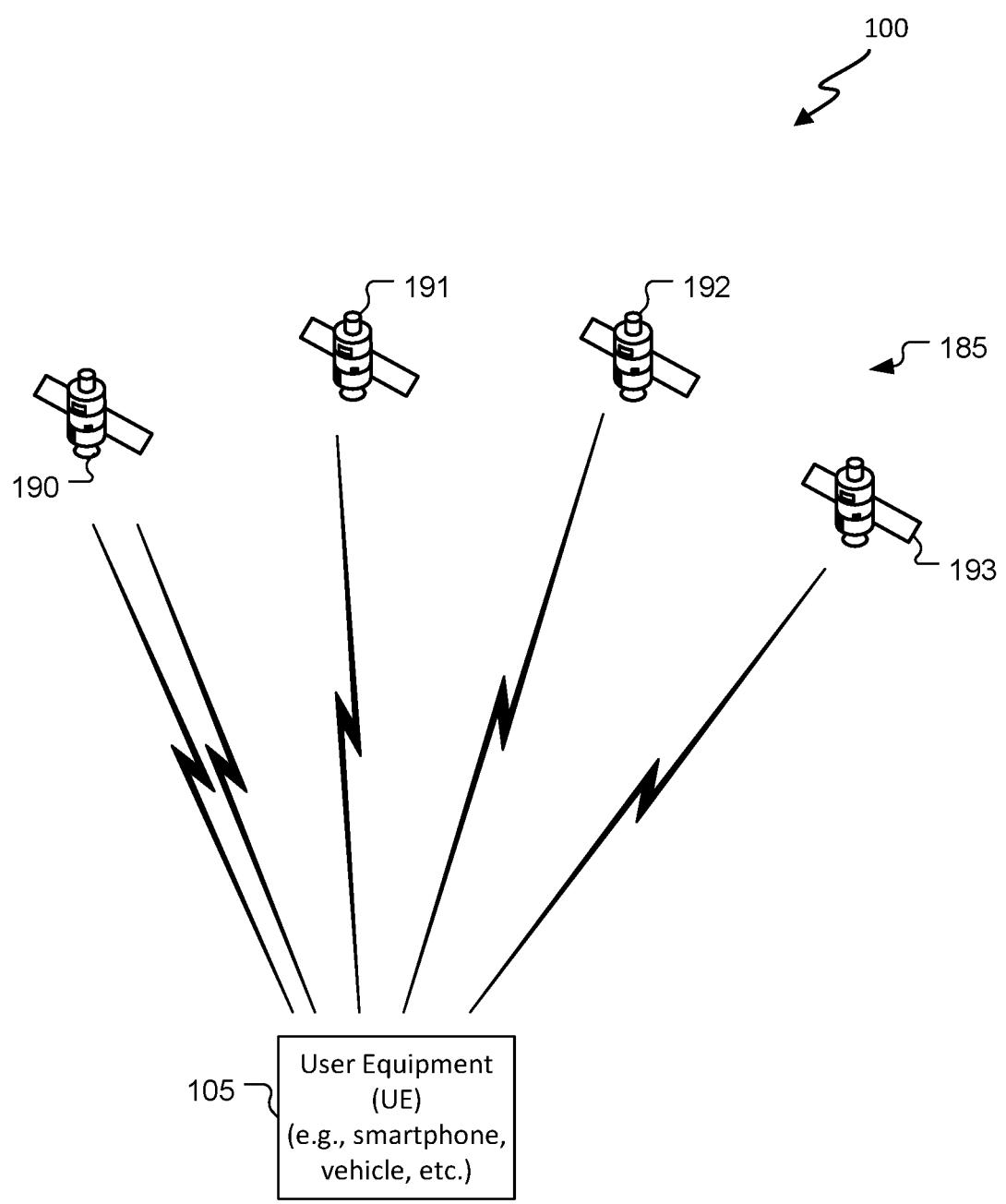
FIG. 1 illustrates a simplified diagram of an example communication system including a user equipment and satellite vehicles.

Obtaining the locations of mobile devices may be useful for many applications including, for example, personal navigation, etc. Existing positioning methods include methods based on measuring signals transmitted from satellite vehicles (SVs). Techniques are discussed herein for improving an accuracy in determining a position of a user equipment based on measuring signals transmitted from satellite vehicles with consideration of measurement errors for signals received within in a current epoch, and possibly in one or more consecutive prior epochs. While the user equipment is located in a challenging environment, such as a terrain with foliage, the user equipment may be prevented from having a line of sight to a sufficient number of satellite vehicles due to blockage due to the terrain. The user equipment may receive signals from the satellite vehicle(s) with measurement errors due to multipath interference, which may result in errors in the position of the user equipment. To improve the positioning performance, the user equipment may consider the measurement errors associated with a list of satellite vehicle(s), from which the user equipment is receiving signals within a current epoch, and possibly within one or more prior epochs, to determine whether the measurement error associated with a satellite vehicle indicates a line of sight between the user equipment and the satellite vehicle. If the measurement error indicates no line of sight, then the signals received by the user equipment from the satellite vehicle may be multipath signals. The user equipment may add the satellite vehicle to a discarded satellite vehicle list. If the measurement error indicates a line of sight, then the signals received by the user equipment may be received directly from the satellite vehicle, and the user equipment may add the satellite vehicle to an active satellite vehicle list. If the number of satellite vehicles in the active satellite vehicle list meets a threshold, such as a threshold required to calculate a position fix, a position of the user equipment based on the signals received from the satellite vehicles in the active satellite vehicle list. In this manner, the rate of errors in the determination of the position of the user equipment in challenging environments due to multipath interference may be reduced, which improves user navigation experience. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

FIG. 1 illustrates a simplified diagram of an example communication system 100 including a user equipment 105 and satellite vehicles (SVs). The user equipment 105 receives and may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). The communication system 100 may include additional or alternative components. With a UE-based position method, the UE 105 may obtain location measurements from signals received from the SVs 190-193 (e.g., measurements may also or instead include measurements of GNSS pseudorange, code phase, and/or carrier phase for the SVs 190-193.) and may compute a location of the UE 105.

As used herein, the term "user equipment" (UE) may be any wireless communication device (e.g., a mobile phone, laptop computer, consumer asset tracking device, etc.) capable of receiving satellite signals. UEs may be embodied by any of a number of types of devices including but not limited to printed circuit (PC) cards, compact flash devices, external or internal modems, wireless or wireline phones, smartphones, tablets, consumer asset tracking devices, asset tags, and so on. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. The UE 105 may be a vehicle-to-everything (V2X) device, such as an On Board Unit (OBU) including a SPS receiver. Other UEs may include wearable devices (e.g., smart watches, smart jewelry, smart glasses, or headsets, etc.). Still other UEs may be used, whether currently existing or developed in the future.

An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Figure 2:
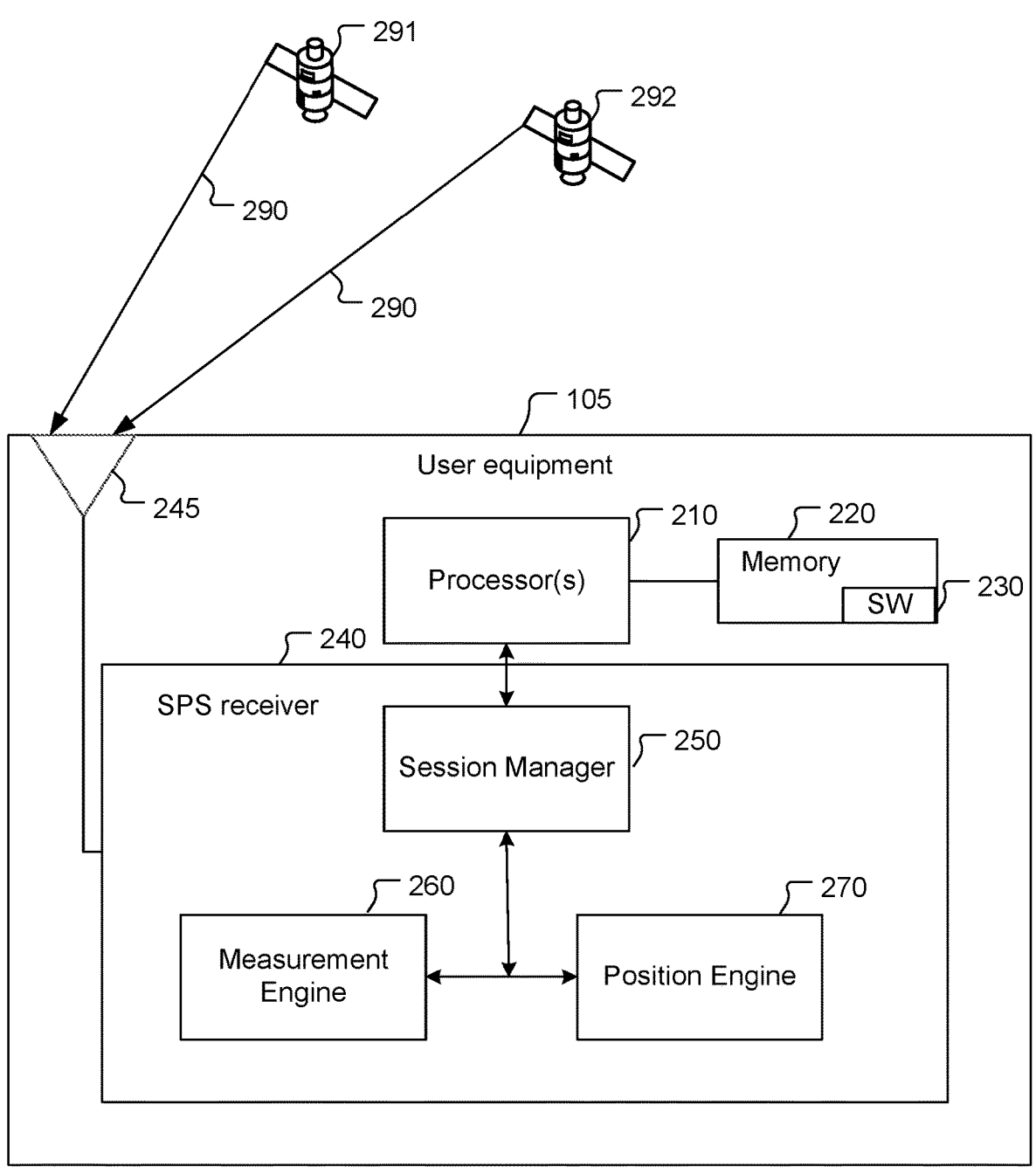
FIG. 2 illustrates an example user equipment.

FIG. 2 illustrates an example UE 105. The UE 105 may comprise a computing platform including one or more processors 210, one or more memories 220 including software (SW) 230, and a Satellite Positioning System (SPS) receiver 240. The one or more processors 210 may comprise multiple processors including a general-purpose/application processor. The one or more memories 220 may be a non-transitory storage medium that may include random access memory (RAM), flash memory, disc memory, and/or read-only memory (ROM), etc. The one or more memories 220 may store the software 230 which may be processor-readable, processor-executable software code containing instructions that may be configured to, when executed, cause the processor 210 to perform various functions described herein. Alternatively, the software 230 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the processor(s) 210 performing a function as shorthand for one or more of the processors performing the function. The description herein may refer to the UE 105 performing a function as shorthand for one or more appropriate components of the UE 105 performing the function. The processor(s) 210 may include one or more memories with stored instructions in addition to and/or instead of the one or more memories 220. Functionality of the one or more processors 210 is discussed more fully below.

The SPS receiver 240 (e.g., a Global Positioning System (GPS) receiver) may be capable of receiving signals 290 from acquired SVs 291, 292 via an SPS antenna 245. The SPS antenna 245 is configured to transduce the signals 290 from wireless signals to wired signals, e.g., electrical, or optical signals. The one or more processors 210, the one or more memories 220, and/or one or more specialized processors (not shown) may be utilized to process signals 290, in whole or in part, and/or to calculate an estimated position of the UE 105, in conjunction with the SPS receiver 240. For example, the SPS receiver 240 may be configured to determine a position of the UE 105 by trilateration using the signals 290. The memory 220 may store indications (e.g., measurements) of the signals 290 and/or other signals for use in performing positioning operations. The processor(s) 210, and/or one or more specialized processors, and/or the memory 220 may provide or support a Session Manager (SM) 250, a Measurement Engine 260, and a Position Engine (PE) 270 of the SPS receiver 240. The SM 250 facilitates communication between an application (possibly implemented by the one or more processors 210, possibly in combination with the one or more memories 220) and the ME 260 and the PE 270, and to perform other functions as described herein. The SM 250, the ME 260, and the PE 270 may be implemented using software, hardware, or a combination of software and hardware. The SM 250 receives a request from an application (e.g., a map or navigation application) for a position on the UE 105. The application may be implemented by the one or more processors 210, possibly in combination with the one or more memories 220. The SM 250 sends the request to the ME 260, and the ME 260 initiates a search for SVs. Upon acquiring SVs 291, 292 and receiving signals 290 from the SVs 291, 292, the ME 260 measures the signals 290. The ME 260 sends measurement reports containing the measurements of the signals 290 to the PE 270. The PE 270 determines the position of the UE 105 using the measurements in the measurement reports. The PE 270 sends the position, along with accuracy and reliability information, to the SM 250. The SM 250 qualifies the position of the UE 105, e.g., uses the position accuracy and position reliability information to determine that the position on the UE 105 meets the requirements of the application. The SM 250 sends the qualified position of the UE 105 to the application. If the SM 250 does not qualify the position of the UE 105, the position is not sent to the application. The measurement of the signals 290 by the ME 260, the determination of the position by the PE 270, and the qualification of the position by the SM 250 continues iteratively. The configuration of the UE 105 shown in FIG. 2 is an example and not limiting of the disclosure, including the claims, and other configurations may be used.

Figure 3:
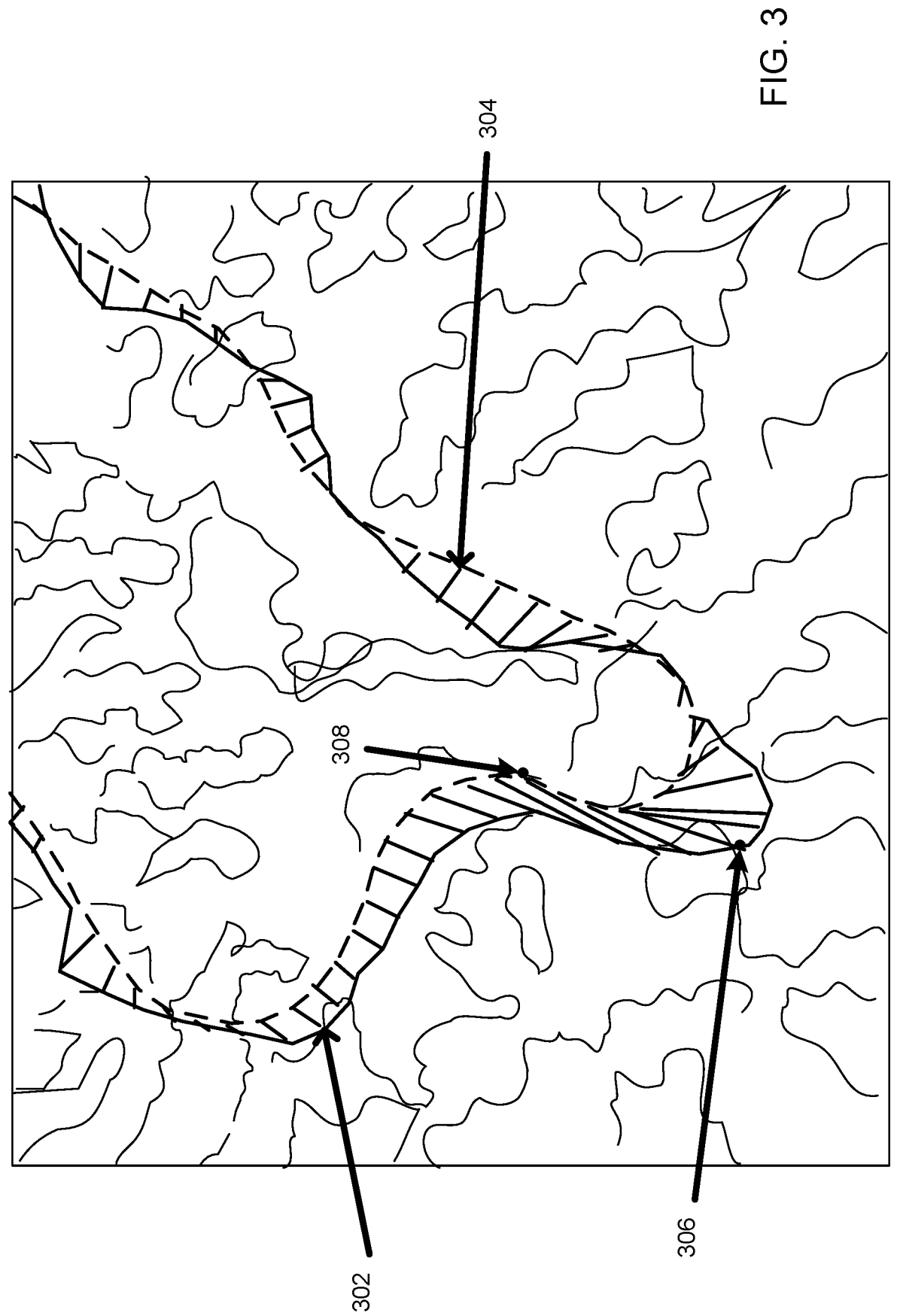
FIG. 3 illustrates an example challenging environment for positioning performance due to measurement errors.

Referring to FIG. 3, in an example environment, a UE 105 may travel through a challenging environment, such as a terrain with dense foliage. For example, the SPS receiver 240 may acquire signals from a number of SVs with large measurement errors, such that the path of travel of the UE 105 is determined to be path 302, while the true path of the UE 105 is path 304. For example, at true location 308, the SPS receiver 240 may be prevented from having a line of sight to one or more SVs, and the signals received from the SVs may be subject to multipath interference, resulting in an erroneous position fix 306. Multipath interference may occur if the signals do not arrive directly from an SV (i.e., no line of sight (LOS) between the UE 105 and the SVs 291, 292) but are reflected or diffracted, such as off of trees or mountains. Such reflections or diffractions cause the signals to travel paths of different lengths between the SVs 291, 292 and the SPS antenna 245 and may result in errors in the distance measurements and the determination of the position of the UE 105. The receipt of the multipath signals (e.g., the signals 290 which are reflected or refracted) may lead to an erroneous position fix by the PE 270 and a reporting of an erroneous position of the UE 105 to the application.

FIG. 4 illustrates a flow diagram for a method 400 for determining a position of the user equipment using measurement errors for signals received within a current epoch. The method 400 is an example only and not limiting. The method 400 may be altered, e.g., by having one or more stages added, removed, rearranged, combined, performed concurrently, and/or by having one or more single stages split into multiple stages. At stage 410, the method 400 includes determining a first acquired SV list comprising one or more first SVs from which the UE 105 is receiving signals within a current epoch. For example, an epoch is a time interval of 1 second or 1 Hz. For example, the PE 270 receives measurement reports from the ME 260 with an indication of one or more first SVs acquired by the ME 260 within the current epoch. The ME 260 may send a measurement report once the SPS 240 acquires at least four SVs within the current epoch. The PE 270 generates a list of the first SVs acquired within a current epoch using the measurement reports to create the first acquired SV list. The one or more processors 210, in combination with the one or more memories 220 and the SPS receiver 240, provide means for determining the first acquired SV list comprising the one or more first SVs from which the UE 105 is receiving signals within the current epoch.

At stage 420, the method 400 includes, for each first SV in the first acquired SV list, determining whether a first measurement error associated with the first SV indicates a LOS between the UE 105 and the first SV. For example, the PE 270 may send a request to the ME 260 for the measurement errors for the first SVs acquired within the current epoch. The ME 260 calculates the measurement error for each first SV acquired within the current epoch and returns the measurement error associated with each first SV in the first acquired SV list to the PE 270. For example, for each first SV in the first acquired SV list, the PE 270 compares the associated first measurement error with a horizontal uncertainty (HUNC). The HUNC may be calculated by the ME 260 to represent a distance or range of a location error based on a confidence value. The confidence value expresses a likelihood of finding the UE 105 within a HUNC range. The first measurement error associated with the first SV being less than the HUNC indicates that the first SV has a LOS with the UE 105. The one or more processors 210, in combination with the one or more memories 220 and the SPS receiver 240, provide means for determining whether the first measurement error associated with the first SV indicates a LOS between the UE 105 and the first SV.

At stage 430, the method 400 includes, for each first SV in the first acquired SV list, in response to the first measurement error indicating a LOS between the UE 105 and the first SV, adding the first SV to an active SV list. For example, for each first SV in the first acquired SV list, in response to the first measurement error associated with the first SV being less than the HUNC, the PE 270 adds the first SV to the active SV list. The one or more processors 210, in combination with the one or more memories 220 and the SPS receiver 240, provide means for adding the first SV to the active SV list.

At stage 440, the method 400 includes determining whether a number of SVs on the active SV list meets a threshold. For example, the SVs on the active SV list includes any first SV in the first acquired SV list that have associated measurement errors less than the HUNC, while any first SV in the first acquired SV list with associated measurement errors greater than the HUNC are not. The PE 270 determines whether the number of SVs in the active SV list meets a threshold of four, with four being a minimum number of SVs required for a position fix. The threshold for the number of SVs in the active SV list may be configured to a different number depending on the requirements of an application using the position fix. For example, an application requiring a higher quality of service may configure the threshold to six SVs in the active SV list. The one or more processors 210, in combination with the one or more memories 220 and the SPS receiver 240, provide means for determining whether the number of SVs in the active SV list meets the threshold.

At stage 450, the method 400 includes, in response to the number of SVs in the active SV list meeting the threshold, determining a position of the UE 105 based on signals received from the SVs in the active SV list. For example, in response to the active SV list having at least four SVs, the PE 270 uses the measurements from the signals received from the SVs in the active SV list to calculate a position of the UE 105 for the current epoch. The one or more processors 210, in combination with the one or more memories 220 and the SPS receiver 240, provide means for determining the position of the UE based on the signals received from the SVs in the active SV list. Since the first SVs in the first acquired SV list with associated measurement errors greater than the HUNC are not included in the active SV list, higher positioning accuracy can be realized using the signals received from the SVs in the active SV list to calculate the position of the UE 105, compared with using the first SVs in the first acquired SV list.

When the number of SVs in the active SV list fails to meet the threshold, for example, the number of SVs in the active SV list is less than four, the PE 270 may not be able to calculate a position of the UE 105. In one embodiment, signals from one or more SVs received within one or more prior epochs may be considered. FIG. 5 illustrates a flow diagram of a method 500 for determining a position of a user equipment with consideration of measurement errors for signals received within one or more prior epochs. The method 500 is an example only and not limiting. The method 500 may be altered, e.g., by having one or more stages added, removed, rearranged, combined, performed concurrently, and/or by having one or more single stages split into multiple stages. At stage 510, the method 500 includes, in response to the number of SVs in the active SV list not meeting the threshold, determining a second acquired SV list comprising one or more second SVs from which the UE 105 received signals within one or more prior epochs. For example, the one or more prior epochs may include one or more consecutive epochs immediately prior to the current epoch. For example, if an epoch is a time interval of 1 second, and the current epoch is second X, then the one or more consecutive prior epochs may be the epochs at second X-1, X-2, X-3, . . . . The number of prior epochs considered by the method 500 may be configured based on the positioning performance and/or the requirements of the application using the position fix. For example, the PE 270 receives measurement reports from the ME 260 with an indication of one or more second SVs acquired by the ME 260 within the one or more consecutive prior epochs. The PE 270 generates a list of the second SVs acquired within the one or more consecutive prior epochs using the measurement reports. The one or more processors 210, in combination with the one or more memories 220 and the SPS receiver 240, provide means for determining the second acquired SV list comprising the one or more second SVs from which the UE 105 is receiving signals within the one or more prior epochs.

At stage 520, the method 500 includes, for each second SV in the second acquired SV list, determining whether a second measurement error associated with the second SV indicates a LOS between the UE 105 and the second SV. For example, the PE 270 may send a request to the ME 260 for the measurement errors for the second SVs acquired within the one or more consecutive prior epochs. The ME 260 calculates the measurement error for each second SV acquired within the one or more consecutive prior epochs and returns the measurement error associated with each second SV to the PE 270. For each second SV in the second acquired SV list, the PE 270 compares the associated second measurement error with the HUNC. The second measurement error associated with the second SV being less than the HUNC indicates that the second SV has a LOS with the UE 105. The one or more processors 210, in combination with the one or more memories 220 and the SPS receiver 240, provide means for determining whether the second measurement error associated with the second SV indicates a LOS between the UE 105 and the second SV.

At stage 530, the method 500 includes, for each second SV in the second acquired SV list, in response to the second measurement error indicating a LOS between the UE 105 and the second SV, adding the second SV to the active SV list. For example, for each second SV in the second acquired SV list with the associated second measurement error being less than the HUNC, the PE 270 adds the second SV to the active SV list. In one example, If the second SV is already in the active SV list, then the second SV is not added again. The one or more processors 210, in combination with the one or more memories 220 and the SPS receiver 240, provide means for adding the second SV to the active SV list.

At stage 540, the method 500 includes determining whether a number of SVs in the active SV list meets a threshold. For example, the SVs in the active SV list includes any first SVs in the first acquired SV list and any second SVs in the second acquired SV list that have associated measurement errors less than the HUNC, while any first SVs and second SVs with associated measurement errors greater than the HUNC are not. The PE 270 determines whether the number of SVs in the active SV list meets a threshold of four, with four being a minimum number of SVs required for a position fix. The threshold for the number of SVs in the active SV list may be configured to a different number depending on the requirements of an application using the position fix. For example, an application requiring a higher quality of service may configure the threshold to six SVs in the active SV list. The one or more processors 210, in combination with the one or more memories 220 and the SPS receiver 240, provide means for determining whether a number of SVs in the active SV list meets the threshold.

At stage 550, the method 500 includes, in response to the number of SVs in the active SV list meeting the threshold, determining a position of the UE 105 based on the signals received from the SVs in the active SV list. For example, in response to the active SV list having at least four SVs, the PE 270 uses the measurements from the signals received from the SVs in the active SV list to calculate a position of the UE 105 for the current epoch. The one or more processors 210, in combination with the one or more memories 220 and the SPS receiver 240, provide means for determining the position of the UE 105 based on the signals received from the SVs in the active SV list. For example, since the time interval of an epoch may be short, compared to the speed of the UE 105 (e.g., a number of seconds), the measurements received within one or more consecutive prior epochs may be usable to calculate the position of the UE 105 within the current epoch. By including in the active SV list the SVs on the first acquired SV list and the second acquired SV list with associated measurement errors less than the HUNC in the active SV list, signals from SVs acquired across multiple epochs may be considered to realize higher positioning accuracy would be obtained for the current epoch, compared with using the first SVs in the first acquired SV list without using the SVs in the second acquired SV list. Measurements from signals received from SVs in the active SV list which were added from the first acquired SV list and the second acquired SV list may be used to determine the position of the UE 105. For example, a Kalman filter may be used to propagate the measurements from the one or more prior epochs to the current epoch.

In one embodiment, the SVs acquired within the current epoch may be considered in combination with the SVs acquired within the one or more prior epochs, without considering whether the SVs in the first acquired SV list results in an active SV list which meets the threshold. FIG. 6 illustrates a flow diagram of a method 600 for determining a position of the UE 105 with consideration of measurement errors for SV signals received within a current epoch and one or more prior epochs. The method 600 is an example only and not limiting. The method 600 may be altered, e.g., by having one or more stages added, removed, rearranged, combined, performed concurrently, and/or by having one or more single stages split into multiple stages. At stage 610, the method 600 includes determining a first acquired SV list comprising one or more first SVs from which the UE 105 is receiving signals within a current epoch. For example, the PE 270 receives measurement reports from the ME 260 with an indication of one or more first SVs acquired by the ME 260 within the current epoch. The ME 260 may send a measurement report once the SPS 240 acquires at least four SVs within the current epoch. The PE 270 generates a list of the first SVs acquired within a current epoch using the measurement reports. The one or more processors 210, in combination with the one or more memories 220 and the SPS receiver 240, provide means for determining the first acquired SV list comprising the one or more first SVs from which the UE 105 is receiving signals within a current epoch.

At stage 620, the method 600 includes, for each first SV in the first acquired SV list, determining whether a first measurement error associated with the first SV indicates a LOS between the UE and the first SV. For example, the PE 270 may send a request to the ME 260 for the measurement errors for the first SVs acquired within the current epoch. The ME 260 calculates the measurement error for each first SV acquired within the current epoch and returns the measurement error associated with each first SV in the first acquired SV list to the PE 270. For example, for each first SV in the first acquired SV list, the PE 270 compares the associated first measurement error with a HUNC. The first measurement error associated with the first SV being less than the HUNC indicates that the first SV has a LOS with the UE 105. The one or more processors 210, in combination with the one or more memories 220 and the SPS receiver 240, provide means for determining whether the first measurement error associated with the first SV in the first acquired SV list indicates a LOS between the UE 105 and the first SV.

At stage 630, for each first SV in the first acquired SV list, in response to the first measurement error indicating a LOS between the UE and the first SV, adding the first SV to an active SV list. For example, for each first SV in the first acquired SV list, in response to the first measurement error associated with the first SV being less than the HUNC, the PE 270 adds the first SV to the active SV list. The one or more processors 210, in combination with the one or more memories 220 and the SPS receiver 240, provide means for adding the first SV to the active SV list.

At stage 640, the method 600 includes determining a second acquired SV list comprising one or more second SVs from which the UE 105 is receiving signals within one or more prior epochs. For example, the one or more prior epochs may include one or more consecutive epochs immediately prior to the current epoch. For example, the PE 270 receives measurement reports from the ME 260 with an indication of one or more second SVs acquired by the ME 260 within the one or more consecutive prior epochs. The PE 270 generates a list of the second SVs acquired within the one or more consecutive prior epochs using the measurement reports. The one or more processors 210, in combination with the one or more memories 220 and the SPS receiver 240, provide means for determining the second acquired SV list comprising the one or more second SVs from which the UE 105 is receiving signals within one or more prior epochs.

At stage 650, the method 600 includes, for each second SV in the second acquired SV list, determining whether a second measurement error associated with the second SV indicates a LOS between the UE 105 and the second SV. For example, the PE 270 may send a request to the ME 260 for the measurement errors for the second SVs acquired within the one or more consecutive prior epochs. The ME 260 calculates the measurement error for each second SV acquired within the one or more consecutive prior epochs and returns the measurement error associated with each second SV in the second acquired SV list to the PE 270. For each second SV in the second acquired SV list, the PE 270 compares the associated second measurement error with the HUNC. The second measurement error associated with the second SV being less than the HUNC indicates that the second SV has a LOS with the UE 105. The one or more processors 210, in combination with the one or more memories 220 and the SPS receiver 240, provide means for determining whether the second measurement error associated with the second SV indicates a LOS between the UE and the second SV.

At stage 660, the method 600 includes, for each second SV in the second acquired SV list, in response to the second measurement error indicating a LOS between the UE 105 and the second SV, adding the second SV to the active SV list. For example, for each second SV in the second acquired SV list with the associated second measurement error being less than the HUNC, the PE 270 adds the second SV to the active SV list. In one example, if the second SV is already in the active SV list, then the second SV need not be added again. The one or more processors 210, in combination with the one or more memories 220 and the SPS receiver 240, provide means for adding the second SV to the active SV list.

At stage 670, the method 600 includes determining whether a number of SVs in the active SV list meets a threshold. For example, the SVs in the active SV list includes any SVs in the first acquired SV list and the second acquired SV list that have associated measurement errors less than the HUNC, while any SVs in the first acquired SV list or the second acquired SV list with associated measurement errors greater than the HUNC are not. The PE 270 determines whether the number of SVs in the active SV list meets a threshold of four, with four being a minimum number of SVs required for a position fix. The threshold for the number of SVs in the active SV list may be configured to a different number depending on the requirements of an application using the position fix. The one or more processors 210, in combination with the one or more memories 220 and the SPS receiver 240, provide means for determining whether the number of SVs in the active SV list meets the threshold.

At stage 680, the method 600 includes, in response to the number of SVs in the active SV list meeting the threshold, determining a position of the UE 105 based on the signals received from the SVs in the active SV list. For example, in response to the active SV list having at least four SVs, the PE 270 uses the measurements from the signals received from the SVs in the active SV list to calculate a position of the UE 105 for the current epoch. The one or more processors 210, in combination with the one or more memories 220 and the SPS receiver 240, provide means for determining the position of the UE 105 based on the signals received from the SVs in the active SV list.

In one embodiment, referring again to stage 430 of the method 400 shown in FIG. 4, for each first SV in the first acquired SV list, the PE 270 compares the associated first measurement error with the HUNC. The first measurement error associated with the first SV being greater than the HUNC indicates that the first SV does not have a LOS with the UE 105. The signals received from the first SV are mostly likely multipath signals. In response, the PE 270 may add the first SV to a discarded SV list. The SVs in the discarded SV list may be considered if the number of SVs in the active SV list does not meet the threshold. FIG. 7 illustrates a flow diagram of a method 700 for determining a position of the UE 105 using SVs discarded in the method of FIG. 4. The method 700 is an example only and not limiting. The method 700 may be altered, e.g., by having one or more stages added, removed, rearranged, combined, performed concurrently, and/or by having one or more single stages split into multiple stages. At stage 710, a method 700 includes, in response to the number of SVs in the active SV list not meeting the threshold, identifying one or more SVs in a discarded SV list with a lowest associated measurement error, where the discarded SV list comprises one or more SVs in the first acquired SV list determined to have no LOS with the UE 105. The one or more processors 210, in combination with the one or more memories 220 and the SPS receiver 240, provide means for identifying one or more SVs in a discarded SV list with the lowest associated measurement error.

At stage 720, the method 700 includes adding the one or more SVs in the discarded list with the lowest associated measurement error to the active SV list. The one or more processors 210, in combination with the one or more memories 220 and the SPS receiver 240, provide means for adding the one or more SVs in the discarded SV list with the lowest associated measurement error to the active SV list.

At stage 730, the method 700 includes determining whether a number of SVs in the active SV list meets the threshold. The one or more processors 210, in combination with the one or more memories 220 and the SPS receiver 240, provide means for determining whether the number of SVs in the active SV list meets the threshold.

At stage 740, the method 700 includes, in response to the number of SVs in the active SV list meeting the threshold, determining a position of the UE 105 based on the signals received from the SVs in the active SV list. The one or more processors 210, in combination with the one or more memories 220 and the SPS receiver 240, provide means for determining the position of the UE 105 based on the signals received from the SVs in the active SV list. By adding the SVs from the discarded SV list to the active SV list if the number of SVs in the active SV list fails to meet the threshold, a sufficient number of SVs required for calculating a position fix of the UE 105 may be realized.

IMPLEMENTATION EXAMPLES

Clause 1. A user equipment, comprising: one or more memories; and one or more processors communicatively coupled to the one or more memories, the one or more processors being configured to: determine a first acquired satellite vehicle list comprising one or more first satellite vehicles from which the user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine whether a number of satellite vehicles in the active satellite vehicle list meets a threshold; and in response to the number of satellite vehicles in the active satellite vehicle list meeting the threshold, determine a position of the user equipment based on the signals received from the satellite vehicles in the active satellite vehicle list.

Clause 2. The user equipment of clause 1, where the one or more processors are further configured to: in response to the number of satellite vehicles in the active satellite vehicle list not meeting the threshold, determine a second acquired satellite vehicle list comprising one or more second satellite vehicles from which the user equipment received signals within one or more prior epochs; for each second satellite vehicle in the second acquired satellite vehicle list, determine whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, add the second satellite vehicle to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 3. The user equipment of clause 2, wherein the one or more prior epochs comprises one or more consecutive epochs immediately prior to the current epoch.

Clause 4. The user equipment of clause 2, wherein to determine whether the second measurement error associated with the second satellite vehicle indicates the line of sight, the one or more processors are configured to: compare the second measurement error with a horizontal uncertainty; and in response to determining that the second measurement error is less than the horizontal uncertainty, determine that the second satellite vehicle has the line of sight with the user equipment.

Clause 5. The user equipment of clause 2, wherein to determine the position of the user equipment based on the signals received from the satellite vehicles in the active satellite vehicle list, the one or more processors are configured to use measurements from signals received from one or more first satellite vehicles in the active satellite vehicle list added from the first acquired satellite vehicle list and one or more second satellite vehicles in the active satellite vehicle list added from the second acquired satellite vehicle list.

Clause 6. The user equipment of clause 2, wherein the one or more processors are further configured to: in response to the number of satellite vehicles in the active satellite vehicle list not meeting the threshold, identify one or more satellite vehicles in a discarded satellite vehicle list with a lowest associated measurement error, the discarded satellite vehicle list comprising one or more first satellite vehicles in the first acquired satellite vehicle list without the line of sight with the user equipment; add the one or more satellite vehicles in the discarded satellite vehicle list with the lowest associated measurement error to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 7. The user equipment of clause 1, wherein to determine whether the first measurement error associated with the first satellite vehicle indicates the line of sight, the one or more processors are configured to: compare the first measurement error with a horizontal uncertainty; and in response to determining that the first measurement error is less than the horizontal uncertainty, determine that the first satellite vehicle has the line of sight with the user equipment.

Clause 8. A method for determining a position of a user equipment, comprising: determining a first acquired satellite vehicle list comprising one or more first satellite vehicles from which the user equipment is receiving signals within a current epoch; for each first satellite vehicle in the first acquired satellite vehicle list, determining whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, adding the first satellite vehicle to an active satellite vehicle list; determining whether a number of satellite vehicles in the active satellite vehicle list meets a threshold; and in response to the number of satellite vehicles in the active satellite vehicle list meeting the threshold, determining a position of the user equipment based on the signals received from the satellite vehicles in the active satellite vehicle list.

Clause 9. The method of clause 8, further comprising: in response to the number of satellite vehicles in the active satellite vehicle list not meeting the threshold, determining a second acquired satellite vehicle list comprising one or more second satellite vehicles from which the user equipment received signals within one or more prior epochs; for each second satellite vehicle in the second acquired satellite vehicle list, determining whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, adding the second satellite vehicle to the active satellite vehicle list; determining whether the number of satellite vehicles in the active satellite vehicle list meets the threshold; and in response to the number of satellites vehicles in the active satellite vehicle list meeting the threshold, determining the position of the user equipment based on the signals received from the satellite vehicles in the active satellite vehicle list.

Clause 10. The method of clause 9, wherein the one or more prior epochs comprises one or more consecutive epochs immediately prior to the current epoch.

Clause 11. The method of clause 9, wherein the determining whether the second measurement error associated with the second satellite vehicle indicates the line of sight, comprises: comparing the second measurement error with a horizontal uncertainty; and in response to determining that the second measurement error is less than the horizontal uncertainty, determining that the second satellite vehicle has the line of sight with the user equipment.

Clause 12. The method of clause 9, wherein the determining the position of the user equipment based on the signals received from the satellite vehicles in the active satellite vehicle list, comprises: using measurements from signals received from one or more first satellite vehicles in the active satellite vehicle list added from the first acquired satellite vehicle list and one or more second satellite vehicles in the active satellite vehicle list added from the second acquired satellite vehicle list.

Clause 13. The method of clause 9, further comprising: in response to the number of satellite vehicles in the active satellite vehicle list not meeting the threshold, identifying one or more satellite vehicles in a discarded satellite vehicle list with a lowest associated measurement error, the discarded satellite vehicle list comprising one or more first satellite vehicles in the first acquired satellite vehicle list without the line of sight with the user equipment; adding the one or more satellite vehicles in the discarded satellite vehicle list with the lowest associated measurement error to the active satellite vehicle list; determining whether the number of satellite vehicles in the active satellite vehicle list meets the threshold; and in response to the number of satellites vehicles in the active satellite vehicle list meeting the threshold, determining the position of the user equipment based on the signals received from the satellite vehicles in the active satellite vehicle list.

Clause 14. The method of clause 8, wherein the determining whether the first measurement error associated with the first satellite vehicle indicates the line of sight, comprises: comparing the first measurement error with a horizontal uncertainty; and in response to determining that the first measurement error is less than the horizontal uncertainty, determining that the first satellite vehicle has the line of sight with the user equipment.

Clause 15. A computing device, comprising: means for determining a first acquired satellite vehicle list comprising one or more first satellite vehicles from which a user equipment is receiving signals within a current epoch; means for, for each first satellite vehicle in the first acquired satellite vehicle list, determining whether a first measurement error associated with the first satellite vehicle indicates a line of sight between the user equipment and the first satellite vehicle; means for, for each first satellite vehicle in the first acquired satellite vehicle list, in response to the first measurement error indicating the line of sight between the user equipment and the first satellite vehicle, adding the first satellite vehicle to an active satellite vehicle list; means for determining whether a number of satellite vehicles in the active satellite vehicle list meets a threshold; and means for, in response to the number of satellite vehicles in the active satellite vehicle list meeting the threshold, determining a position of the user equipment based on the signals received from the satellite vehicles in the active satellite vehicle list.

Clause 16. The device of clause 15, further comprising: means for, in response to the number of satellite vehicles in the active satellite vehicle list not meeting the threshold, determining a second acquired satellite vehicle list comprising one or more second satellite vehicles from which the user equipment received signals within one or more prior epochs; means for, for each second satellite vehicle in the second acquired satellite vehicle list, determining whether a second measurement error associated with the second satellite vehicle indicates a line of sight between the user equipment and the second satellite vehicle; means for, for each second satellite vehicle in the second acquired satellite vehicle list, in response to the second measurement error indicating the line of sight between the user equipment and the second satellite vehicle, adding the second satellite vehicle to the active satellite vehicle list; means for determining whether the number of satellite vehicles in the active satellite vehicle list meets the threshold; and means for, in response to the number of satellites vehicles in the active satellite vehicle list meeting the threshold, determining the position of the user equipment based on the signals received from the satellite vehicles in the active satellite vehicle list.

Clause 17. The device of clause 16, wherein the one or more prior epochs comprises one or more consecutive epochs immediately prior to the current epoch.

Clause 18. The device of clause 16, wherein the means for determining whether the second measurement error associated with the second satellite vehicle indicates the line of sight, comprises: means for comparing the second measurement error with a horizontal uncertainty; and means for, in response to determining that the second measurement error is less than the horizontal uncertainty, determining that the second satellite vehicle has the line of sight with the user equipment.

Clause 19. The device of clause 16, wherein the means for determining the position of the user equipment based on the signals received from the satellite vehicles in the active satellite vehicle list, comprises: means for using measurements from signals received from one or more first satellite vehicles in the active satellite vehicle list added from the first acquired satellite vehicle list and one or more second satellite vehicles in the active satellite vehicle list added from the second acquired satellite vehicle list.

Clause 20. The device of clause 16, further comprising: means for, in response to the number of satellite vehicles in the active satellite vehicle list not meeting the threshold, identifying one or more satellite vehicles in a discarded satellite vehicle list with a lowest associated measurement error, the discarded satellite vehicle list comprising one or more first satellite vehicles in the first acquired satellite vehicle list without the line of sight with the user equipment; means for adding the one or more satellite vehicles in the discarded satellite vehicle list with the lowest associated measurement error to the active satellite vehicle list; means for determining whether the number of satellite vehicles in the active satellite vehicle list meets the threshold; and means for, in response to the number of satellites vehicles in the active satellite vehicle list meeting the threshold, determining the position of the user equipment based on the signals received from the satellite vehicles in the active satellite vehicle list.

Clause 21. The device of clause 15, wherein the means for determining whether the first measurement error associated with the first satellite vehicle indicates the line of sight, comprises: means for comparing the first measurement error with a horizontal uncertainty; and means for, in response to determining that the first measurement error is less than the horizontal uncertainty, determining that the first satellite vehicle has the line of sight with the user equipment.

Clause 22. A non-transitory, processor-readable storage medium comprising processor-readable instructions to cause one or more processors to: determine a first acquired satellite vehicle list comprising one or more first satellite vehicles from which a user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine whether a number of satellite vehicles in the active satellite vehicle list meets a threshold; and in response to the number of satellite vehicles in the active satellite vehicle list meeting the threshold, determine a position of the user equipment based on the signals received from the satellite vehicles in the active satellite vehicle list.

Clause 23. The medium of clause 22, where the one or more processors are further configured to: in response to the number of satellite vehicles in the active satellite vehicle list not meeting the threshold, determine a second acquired satellite vehicle list comprising one or more second satellite vehicles from which the user equipment received signals within one or more prior epochs; for each second satellite vehicle in the second acquired satellite vehicle list, determine whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, add the second satellite vehicle to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 24. The medium of clause 23, wherein the one or more prior epochs comprises one or more consecutive epochs immediately prior to the current epoch.

Clause 25. The medium of clause 23, wherein to determine whether the second measurement error associated with the second satellite vehicle indicates the line of sight, the one or more processors are configured to: compare the second measurement error with a horizontal uncertainty; and in response to determining that the second measurement error is less than the horizontal uncertainty, determine that the second satellite vehicle has the line of sight with the user equipment.

Clause 26. The medium of clause 23, wherein to determine the position of the user equipment based on the signals received from the satellite vehicles in the active satellite vehicle list, the one or more processors are configured to use measurements from signals received from one or more first satellite vehicles in the active satellite vehicle list added from the first acquired satellite vehicle list and one or more second satellite vehicles in the active satellite vehicle list added from the second acquired satellite vehicle list.

Clause 27. The medium of clause 23, wherein the one or more processors are further configured to: in response to the number of satellite vehicles in the active satellite vehicle list not meeting the threshold, identify one or more satellite vehicles in a discarded satellite vehicle list with a lowest associated measurement error, the discarded satellite vehicle list comprising one or more first satellite vehicles in the first acquired satellite vehicle list without the line of sight with the user equipment; add the one or more satellite vehicles in the discarded satellite vehicle list with the lowest associated measurement error to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 28. The medium of clause 22, wherein to determine whether the first measurement error associated with the first satellite vehicle indicates the line of sight, the one or more processors are configured to: compare the first measurement error with a horizontal uncertainty; and in response to determining that the first measurement error is less than the horizontal uncertainty, determine that the first satellite vehicle has the line of sight with the user equipment.

Clause 29. A user equipment, comprising: one or more memories; and one or more processors communicatively coupled to the one or more memories, the one or more processors being configured to: determine a first acquired satellite vehicle list comprising one or more first satellite vehicles from which the user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine a second acquired satellite vehicle list comprising one or more second satellite vehicles from which the user equipment is receiving signals within one or more prior epochs; for each second satellite vehicle in the second acquired satellite vehicle list, determine whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, add the second satellite vehicle to the active satellite vehicle list; determine whether a number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 30. The user equipment of clause 29, wherein the one or more processors are further configured to: in response to the number of satellite vehicles in the active satellite vehicle list not meeting the threshold, identify one or more satellite vehicles in a discarded satellite vehicle list with a lowest associated measurement error, the discarded satellite vehicle list comprising one or more first satellite vehicles in the first acquired satellite vehicle list without the line of sight with the user equipment; add the one or more satellite vehicles in the discarded satellite vehicle list with the lowest associated measurement error to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 31. A method for determining a position of a user equipment, comprising: determining a first acquired satellite vehicle list comprising one or more first satellite vehicles from which the user equipment is receiving signals within a current epoch; for each first satellite vehicle in the first acquired satellite vehicle list, determining whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, adding the first satellite vehicle to an active satellite vehicle list; determining a second acquired satellite vehicle list comprising one or more second satellite vehicles from which the user equipment is receiving signals within one or more prior epochs; for each second satellite vehicle in the second acquired satellite vehicle list, determining whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, adding the second satellite vehicle to the active satellite vehicle list; determining whether a number of satellite vehicles in the active satellite vehicle list meets the threshold; and in response to the number of satellites vehicles in the active satellite vehicle list meeting the threshold, determining the position of the user equipment based on the signals received from the satellite vehicles in the active satellite vehicle list.

Clause 32. The method of clause 31, further comprising: in response to the number of satellite vehicles in the active satellite vehicle list not meeting the threshold, identifying one or more satellite vehicles in a discarded satellite vehicle list with a lowest associated measurement error, the discarded satellite vehicle list comprising one or more first satellite vehicles in the first acquired satellite vehicle list without the line of sight with the user equipment; adding the one or more satellite vehicles in the discarded satellite vehicle list with the lowest associated measurement error to the active satellite vehicle list; determining whether the number of satellite vehicles in the active satellite vehicle list meets the threshold; and in response to the number of satellites vehicles in the active satellite vehicle list meeting the threshold, determining the position of the user equipment based on the signals received from the satellite vehicles in the active satellite vehicle list.

Clause 33. A computing device, comprising: means for determining a first acquired satellite vehicle list comprising one or more first satellite vehicles from which a user equipment is receiving signals within a current epoch; means for, for each first satellite vehicle in the first acquired satellite vehicle list, determining whether a first measurement error associated with the first satellite vehicle indicates a line of sight between the user equipment and the first satellite vehicle; means for, for each first satellite vehicle in the first acquired satellite vehicle list, in response to the first measurement error indicating the line of sight between the user equipment and the first satellite vehicle, adding the first satellite vehicle to an active satellite vehicle list; means for determining a second acquired satellite vehicle list comprising one or more second satellite vehicles from which the user equipment is receiving signals within one or more prior epochs; means for, for each second satellite vehicle in the second acquired satellite vehicle list, determining whether a second measurement error associated with the second satellite vehicle indicates a line of sight between the user equipment and the second satellite vehicle; means for, for each second satellite vehicle in the second acquired satellite vehicle list, in response to the second measurement error indicating the line of sight between the user equipment and the second satellite vehicle, adding the second satellite vehicle to the active satellite vehicle list; means for determining whether a number of satellite vehicles in the active satellite vehicle list meets the threshold; and means for, in response to the number of satellites vehicles in the active satellite vehicle list meeting the threshold, determining the position of the user equipment based on the signals received from the satellite vehicles in the active satellite vehicle list.

Clause 34. The device of clause 33, further comprising: means for, in response to the number of satellite vehicles in the active satellite vehicle list not meeting the threshold, identifying one or more satellite vehicles in a discarded satellite vehicle list with a lowest associated measurement error, the discarded satellite vehicle list comprising one or more first satellite vehicles in the first acquired satellite vehicle list without the line of sight with the user equipment; means for adding the one or more satellite vehicles in the discarded satellite vehicle list with the lowest associated measurement error to the active satellite vehicle list; means for determining whether the number of satellite vehicles in the active satellite vehicle list meets the threshold; and means for, in response to the number of satellites vehicles in the active satellite vehicle list meeting the threshold, determining the position of the user equipment based on the signals received from the satellite vehicles in the active satellite vehicle list.

Clause 35. A non-transitory, processor-readable storage medium comprising processor-readable instructions to cause one or more processors to: determine a first acquired satellite vehicle list comprising one or more first satellite vehicles from which a user equipment is receiving signals within a current epoch; for each first satellite vehicle in the first acquired satellite vehicle list, determine whether a first measurement error associated with the first satellite vehicle indicates a line of sight between the user equipment and the first satellite vehicle; for each first satellite vehicle in the first acquired satellite vehicle list, in response to the first measurement error indicating the line of sight between the user equipment and the first satellite vehicle, add the first satellite vehicle to an active satellite vehicle list; determine a second acquired satellite vehicle list comprising one or more second satellite vehicles from which the user equipment is receiving signals within one or more prior epochs; for each second satellite vehicle in the second acquired satellite vehicle list, determine whether a second measurement error associated with the second satellite vehicle indicates a line of sight between the user equipment and the second satellite vehicle; for each second satellite vehicle in the second acquired satellite vehicle list, in response to the second measurement error indicating the line of sight between the user equipment and the second satellite vehicle, add the second satellite vehicle to the active satellite vehicle list; determine whether a number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Clause 36. The medium of clause 35, wherein the one or more processors are further configured to: in response to the number of satellite vehicles in the active satellite vehicle list not meeting the threshold, identify one or more satellite vehicles in a discarded satellite vehicle list with a lowest associated measurement error, the discarded satellite vehicle list comprising one or more first satellite vehicles in the first acquired satellite vehicle list without the line of sight with the user equipment; add the one or more satellite vehicles in the discarded satellite vehicle list with the lowest associated measurement error to the active satellite vehicle list; determine whether the number of satellite vehicles in the active satellite vehicle list meets the threshold; and in response to the number of satellites vehicles in the active satellite vehicle list meeting the threshold, determine the position of the user equipment based on the signals received from the satellite vehicles in the active satellite vehicle list.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment, comprising:
one or more memories; and
one or more processors communicatively coupled to the one or more memories, the one or more processors being configured to:
 determine a first acquired satellite vehicle list comprising one or more first satellite vehicles from which the user equipment receives signals within a current epoch;
 determine, for each first satellite vehicle in the first acquired satellite vehicle list, whether a first measurement error associated with the first satellite vehicle indicates a line of sight between the user equipment and the first satellite vehicle;
 add, for each first satellite vehicle in the first acquired satellite vehicle list, in response to the first measurement error indicating the line of sight between the user equipment and the first satellite vehicle, the first satellite vehicle to an active satellite vehicle list;
 determine whether a number of satellite vehicles in the active satellite vehicle list meets a threshold;
 determine, in response to the number of satellite vehicles in the active satellite vehicle list not meeting the threshold, a second acquired satellite vehicle list comprising one or more second satellite vehicles from which the user equipment received signals within one or more prior epochs;
 determine, for each second satellite vehicle in the second acquired satellite vehicle list, whether a second measurement error associated with the second satellite vehicle indicates a line of sight between the user equipment and the second satellite vehicle;
 add, for each second satellite vehicle in the second acquired satellite vehicle list, in response to the second measurement error indicating the line of sight between the user equipment and the second satellite vehicle, add the second satellite vehicle to the active satellite vehicle list; and
 determine whether the number of satellite vehicles in the active satellite vehicle list meets the threshold; and
 determine, in response to the number of satellite vehicles in the active satellite vehicle list meeting the threshold, a position of the user equipment based on the signals received from the satellite vehicles in the active satellite vehicle list.

2. The user equipment of claim 1, wherein the one or more prior epochs comprises one or more consecutive epochs immediately prior to the current epoch.

3. The user equipment of claim 1, wherein to determine whether the second measurement error associated with the second satellite vehicle indicates the line of sight, the one or more processors are configured to:
 compare the second measurement error with a horizontal uncertainty; and
 determine, in response to determining that the second measurement error is less than the horizontal uncertainty, that the second satellite vehicle has the line of sight with the user equipment.

4. The user equipment of claim 1, wherein to determine the position of the user equipment based on the signals received from the satellite vehicles in the active satellite vehicle list, the one or more processors are configured to use measurements from signals received from one or more first satellite vehicles in the active satellite vehicle list added from the first acquired satellite vehicle list and one or more second satellite vehicles in the active satellite vehicle list added from the second acquired satellite vehicle list.

5. The user equipment of claim 1, wherein the one or more processors are further configured to:
 identify, in response to the number of satellite vehicles in the active satellite vehicle list not meeting the threshold, one or more satellite vehicles in a discarded satellite vehicle list with a lowest associated measurement error, the discarded satellite vehicle list comprising one or more first satellite vehicles in the first acquired satellite vehicle list without the line of sight with the user equipment;
 add the one or more satellite vehicles in the discarded satellite vehicle list with the lowest associated measurement error to the active satellite vehicle list;
 determine whether the number of satellite vehicles in the active satellite vehicle list meets the threshold; and
 determine, in response to the number of satellites vehicles in the active satellite vehicle list meeting the threshold, the position of the user equipment based on the signals received from the satellite vehicles in the active satellite vehicle list.

6. A user equipment, comprising:
one or more memories; and
one or more processors communicatively coupled to the one or more memories, the one or more processors being configured to:
 determine a first acquired satellite vehicle list comprising one or more first satellite vehicles from which the user equipment receives signals within a current epoch;
 determine, for each first satellite vehicle in the first acquired satellite vehicle list, whether a first measurement error associated with the first satellite vehicle indicates a line of sight between the user equipment and the first satellite vehicle;
 add, for each first satellite vehicle in the first acquired satellite vehicle list, in response to the first measurement error indicating the line of sight between the user equipment and the first satellite vehicle, the first satellite vehicle to an active satellite vehicle list;
 determine whether a number of satellite vehicles in the active satellite vehicle list meets a threshold; and
 determine, in response to the number of satellite vehicles in the active satellite vehicle list meeting the threshold, a position of the user equipment based on the signals received from the satellite vehicles in the active satellite vehicle list;

wherein to determine whether the first measurement error associated with the first satellite vehicle indicates the line of sight, the one or more processors are configured to:

compare the first measurement error with a horizontal uncertainty; and determine, in response to determining that the first measurement error is less than the horizontal uncertainty, that the first satellite vehicle has the line of sight with the user equipment.

7. A method for determining a position of a user equipment, comprising:

determining a first acquired satellite vehicle list comprising one or more first satellite vehicles from which the user equipment receives signals within a current epoch;

determining, for each first satellite vehicle in the first acquired satellite vehicle list, whether a first measurement error associated with the first satellite vehicle indicates a line of sight between the user equipment and the first satellite vehicle;

adding, for each first satellite vehicle in the first acquired satellite vehicle list, in response to the first measurement error indicating the line of sight between the user equipment and the first satellite vehicle, the first satellite vehicle to an active satellite vehicle list;

determining whether a number of satellite vehicles in the active satellite vehicle list meets a threshold;

determining, in response to the number of satellite vehicles in the active satellite vehicle list not meeting the threshold, a second acquired satellite vehicle list comprising one or more second satellite vehicles from which the user equipment received signals within one or more prior epochs;

determining, for each second satellite vehicle in the second acquired satellite vehicle list, whether a second measurement error associated with the second satellite vehicle indicates a line of sight between the user equipment and the second satellite vehicle;

adding, for each second satellite vehicle in the second acquired satellite vehicle list, in response to the second measurement error indicating the line of sight between the user equipment and the second satellite vehicle, the second satellite vehicle to the active satellite vehicle list;

determining whether the number of satellite vehicles in the active satellite vehicle list meets the threshold; and determining, in response to the number of satellite vehicles in the active satellite vehicle list meeting the threshold, a position of the user equipment based on the signals received from the satellite vehicles in the active satellite vehicle list.

8. The method of claim 7, wherein the one or more prior epochs comprises one or more consecutive epochs immediately prior to the current epoch.

9. The method of claim 7, wherein the determining whether the second measurement error associated with the second satellite vehicle indicates the line of sight, comprises:

comparing the second measurement error with a horizontal uncertainty; and determining, in response to determining that the second measurement error is less than the horizontal uncertainty, that the second satellite vehicle has the line of sight with the user equipment.

10. The method of claim 7, wherein the determining the position of the user equipment based on the signals received from the satellite vehicles in the active satellite vehicle list, comprises: using measurements from signals received from one or more first satellite vehicles in the active satellite vehicle list added from the first acquired satellite vehicle list and one or more second satellite vehicles in the active satellite vehicle list added from the second acquired satellite vehicle list.

11. The method of claim 7, further comprising:

identifying, in response to the number of satellite vehicles in the active satellite vehicle list not meeting the threshold, identifying one or more satellite vehicles in a discarded satellite vehicle list with a lowest associated measurement error, the discarded satellite vehicle list comprising one or more first satellite vehicles in the first acquired satellite vehicle list without the line of sight with the user equipment;

adding the one or more satellite vehicles in the discarded satellite vehicle list with the lowest associated measurement error to the active satellite vehicle list;

determining whether the number of satellite vehicles in the active satellite vehicle list meets the threshold; and determining, in response to the number of satellites vehicles in the active satellite vehicle list meeting the threshold, the position of the user equipment based on the signals received from the satellite vehicles in the active satellite vehicle list.

12. A method for determining a position of a user equipment, comprising:

determining a first acquired satellite vehicle list comprising one or more first satellite vehicles from which the user equipment receives signals within a current epoch;

determining, for each first satellite vehicle in the first acquired satellite vehicle list, whether a first measurement error associated with the first satellite vehicle indicates a line of sight between the user equipment and the first satellite vehicle;

adding, for each first satellite vehicle in the first acquired satellite vehicle list, in response to the first measurement error indicating the line of sight between the user equipment and the first satellite vehicle, the first satellite vehicle to an active satellite vehicle list;

determining whether a number of satellite vehicles in the active satellite vehicle list meets a threshold; and determining, in response to the number of satellite vehicles in the active satellite vehicle list meeting the threshold, a position of the user equipment based on the signals received from the satellite vehicles in the active satellite vehicle list;

wherein the determining whether the first measurement error associated with the first satellite vehicle indicates the line of sight, comprises:

comparing the first measurement error with a horizontal uncertainty; and determining, in response to determining that the first measurement error is less than the horizontal uncertainty, that the first satellite vehicle has the line of sight with the user equipment.

13. A computing device, comprising:

means for determining a first acquired satellite vehicle list comprising one or more first satellite vehicles from which a user equipment receives signals within a current epoch;

means for determining, for each first satellite vehicle in the first acquired satellite vehicle list, whether a first measurement error associated with the first satellite vehicle indicates a line of sight between the user equipment and the first satellite vehicle;

means for adding, for each first satellite vehicle in the first acquired satellite vehicle list, in response to the first measurement error indicating the line of sight between the user equipment and the first satellite vehicle, the first satellite vehicle to an active satellite vehicle list;

means for determining whether a number of satellite vehicles in the active satellite vehicle list meets a threshold;

means for determining, in response to the number of satellite vehicles in the active satellite vehicle list not meeting the threshold, a second acquired satellite vehicle list comprising one or more second satellite vehicles from which the user equipment received signals within one or more prior epochs;

means for determining, for each second satellite vehicle in the second acquired satellite vehicle list, whether a second measurement error associated with the second satellite vehicle indicates a line of sight between the user equipment and the second satellite vehicle;

means for adding, for each second satellite vehicle in the second acquired satellite vehicle list, in response to the second measurement error indicating the line of sight between the user equipment and the second satellite vehicle, the second satellite vehicle to the active satellite vehicle list;

means for determining whether the number of satellite vehicles in the active satellite vehicle list meets the threshold; and means for determining, in response to the number of satellite vehicles in the active satellite vehicle list meeting the threshold, a position of the user equipment based on the signals received from the satellite vehicles in the active satellite vehicle list.

14. The device of claim 13, wherein the one or more prior epochs comprises one or more consecutive epochs immediately prior to the current epoch.

15. The device of claim 13, wherein the means for determining whether the second measurement error associated with the second satellite vehicle indicates the line of sight, comprises:

means for comparing the second measurement error with a horizontal uncertainty; and means for determining, in response to determining that the second measurement error is less than the horizontal uncertainty, that the second satellite vehicle has the line of sight with the user equipment.

16. The device of claim 13, wherein the means for determining the position of the user equipment based on the signals received from the satellite vehicles in the active satellite vehicle list, comprises: means for using measurements from signals received from one or more first satellite vehicles in the active satellite vehicle list added from the first acquired satellite vehicle list and one or more second satellite vehicles in the active satellite vehicle list added from the second acquired satellite vehicle list.

17. The device of claim 13, further comprising:

means for identifying, in response to the number of satellite vehicles in the active satellite vehicle list not meeting the threshold, one or more satellite vehicles in a discarded satellite vehicle list with a lowest associated measurement error, the discarded satellite vehicle list comprising one or more first satellite vehicles in the first acquired satellite vehicle list without the line of sight with the user equipment;

means for adding the one or more satellite vehicles in the discarded satellite vehicle list with the lowest associated measurement error to the active satellite vehicle list;

means for determining whether the number of satellite vehicles in the active satellite vehicle list meets the threshold; and means for determining, in response to the number of satellites vehicles in the active satellite vehicle list meeting the threshold, the position of the user equipment based on the signals received from the satellite vehicles in the active satellite vehicle list.

18. A computing device, comprising:

means for determining a first acquired satellite vehicle list comprising one or more first satellite vehicles from which a user equipment receives signals within a current epoch;

means for determining, for each first satellite vehicle in the first acquired satellite vehicle list, whether a first measurement error associated with the first satellite vehicle indicates a line of sight between the user equipment and the first satellite vehicle;

means for adding, for each first satellite vehicle in the first acquired satellite vehicle list, in response to the first measurement error indicating the line of sight between the user equipment and the first satellite vehicle, the first satellite vehicle to an active satellite vehicle list;

means for determining whether a number of satellite vehicles in the active satellite vehicle list meets a threshold; and means for determining, in response to the number of satellite vehicles in the active satellite vehicle list meeting the threshold, a position of the user equipment based on the signals received from the satellite vehicles in the active satellite vehicle list;

wherein the means for determining whether the first measurement error associated with the first satellite vehicle indicates the line of sight, comprises:

means for comparing the first measurement error with a horizontal uncertainty; and means for determining, in response to determining that the first measurement error is less than the horizontal uncertainty, that the first satellite vehicle has the line of sight with the user equipment.

19. A non-transitory, processor-readable storage medium comprising processor-readable instructions to cause one or more processors to:

determine a first acquired satellite vehicle list comprising one or more first satellite vehicles from which a user equipment receives signals within a current epoch;

determine, for each first satellite vehicle in the first acquired satellite vehicle list, whether a first measurement error associated with the first satellite vehicle indicates a line of sight between the user equipment and the first satellite vehicle;

add for each first satellite vehicle in the first acquired satellite vehicle list, in response to the first measurement error indicating the line of sight between the user equipment and the first satellite vehicle, the first satellite vehicle to an active satellite vehicle list;

determine whether a number of satellite vehicles in the active satellite vehicle list meets a threshold;

determine, in response to the number of satellite vehicles in the active satellite vehicle list not meeting the threshold, a second acquired satellite vehicle list comprising one or more second satellite vehicles from which the user equipment received signals within one or more prior epochs;

determine, for each second satellite vehicle in the second acquired satellite vehicle list, whether a second measurement error associated with the second satellite vehicle indicates a line of sight between the user equipment and the second satellite vehicle;

add, for each second satellite vehicle in the second acquired satellite vehicle list, in response to the second measurement error indicating the line of sight between the user equipment and the second satellite vehicle, the second satellite vehicle to the active satellite vehicle list;

determine whether the number of satellite vehicles in the active satellite vehicle list meets the threshold; and determine, in response to the number of satellite vehicles in the active satellite vehicle list meeting the threshold, a position of the user equipment based on the signals received from the satellite vehicles in the active satellite vehicle list.

20. The medium of claim 19, wherein the one or more prior epochs comprises one or more consecutive epochs immediately prior to the current epoch.

21. The medium of claim 19, wherein to determine whether the second measurement error associated with the second satellite vehicle indicates the line of sight, the processor-readable instructions include processor-readable instructions to cause the one or more processors to:

compare the second measurement error with a horizontal uncertainty; and determine, in response to determining that the second measurement error is less than the horizontal uncertainty, that the second satellite vehicle has the line of sight with the user equipment.

22. The medium of claim 19, wherein to determine the position of the user equipment based on the signals received from the satellite vehicles in the active satellite vehicle list, the processor-readable instructions include processor-readable instructions to cause the one or more processors to use measurements from signals received from one or more first satellite vehicles in the active satellite vehicle list added from the first acquired satellite vehicle list and one or more second satellite vehicles in the active satellite vehicle list added from the second acquired satellite vehicle list.

23. The medium of claim 19, wherein the processor-readable instructions include processor-readable instructions to cause the one or more processors to:

identify, in response to the number of satellite vehicles in the active satellite vehicle list not meeting the threshold, one or more satellite vehicles in a discarded satellite vehicle list with a lowest associated measurement error, the discarded satellite vehicle list comprising one or more first satellite vehicles in the first acquired satellite vehicle list without the line of sight with the user equipment;

add the one or more satellite vehicles in the discarded satellite vehicle list with the lowest associated measurement error to the active satellite vehicle list;

determine whether the number of satellite vehicles in the active satellite vehicle list meets the threshold; and determine, in response to the number of satellites vehicles in the active satellite vehicle list meeting the threshold, the position of the user equipment based on the signals received from the satellite vehicles in the active satellite vehicle list.

24. A non-transitory, processor-readable storage medium comprising processor-readable instructions to cause one or more processors to:

determine a first acquired satellite vehicle list comprising one or more first satellite vehicles from which a user equipment receives signals within a current epoch;

determine, for each first satellite vehicle in the first acquired satellite vehicle list, whether a first measurement error associated with the first satellite vehicle indicates a line of sight between the user equipment and the first satellite vehicle;

add for each first satellite vehicle in the first acquired satellite vehicle list, in response to the first measurement error indicating the line of sight between the user equipment and the first satellite vehicle, the first satellite vehicle to an active satellite vehicle list;

determine whether a number of satellite vehicles in the active satellite vehicle list meets a threshold; and determine, in response to the number of satellite vehicles in the active satellite vehicle list meeting the threshold, a position of the user equipment based on the signals received from the satellite vehicles in the active satellite vehicle list;

wherein to determine whether the first measurement error associated with the first satellite vehicle indicates the line of sight, the processor-readable instructions include processor-readable instructions to cause the one or more processors to:

compare the first measurement error with a horizontal uncertainty; and determine, in response to determining that the first measurement error is less than the horizontal uncertainty, that the first satellite vehicle has the line of sight with the user equipment.

* * * * *